United States Patent
Yoakim et al.

(10) Patent No.: US 10,470,606 B2
(45) Date of Patent: Nov. 12, 2019

(54) AUTOMATIC BEVERAGE MACHINE

(75) Inventors: Alfred Yoakim, St-Legier-la-Chiesaz (CH); Youcef Ait Bouziad, Echandens (CH); Fabien Ludovic Agon, Blonay (CH); Alexandre Kollep, Lutry (CH); Gilles Gavillet, Ursy (CH)

(73) Assignee: Societe des Produits Nestle S.A., Vevey (CH)

( * ) Notice: Subject to any disclaimer, the term of this patent is extended or adjusted under 35 U.S.C. 154(b) by 542 days.

(21) Appl. No.: 14/004,007

(22) PCT Filed: Mar. 13, 2012

(86) PCT No.: PCT/EP2012/054348
§ 371 (c)(1),
(2), (4) Date: Sep. 9, 2013

(87) PCT Pub. No.: WO2012/123440
PCT Pub. Date: Sep. 20, 2012

(65) Prior Publication Data
US 2013/0344206 A1    Dec. 26, 2013

(30) Foreign Application Priority Data
Mar. 14, 2011   (EP) .................................... 11158017

(51) Int. Cl.
*A47J 31/44*   (2006.01)
*A47J 31/52*   (2006.01)
*A47J 31/36*   (2006.01)

(52) U.S. Cl.
CPC ......... *A47J 31/4492* (2013.01); *A47J 31/369* (2013.01); *A47J 31/52* (2013.01)

(58) Field of Classification Search
USPC .......................................................... 99/295
See application file for complete search history.

(56) References Cited

U.S. PATENT DOCUMENTS

| 4,829,889 A | * | 5/1989 | Takeuchi | ............ | A47J 31/0668 |
|---|---|---|---|---|---|
| | | | | | 99/285 |
| 2007/0245901 A1 | | 10/2007 | Blanc et al. | | |

(Continued)

FOREIGN PATENT DOCUMENTS

| EP | 1541070 | 6/2005 |
|---|---|---|
| EP | 1935298 | 6/2008 |

(Continued)

OTHER PUBLICATIONS

Espacenet machine translation of Launay (FR 2907766).*
European Search Report corresponding to Application No. 18168473.9, dated Aug. 2, 2018; (7 pages).

*Primary Examiner* — Viren A Thakur
*Assistant Examiner* — Thanh H Nguyen
(74) *Attorney, Agent, or Firm* — K&L Gates LLP (57) ABSTRACT

The invention pertains to the field of the beverage preparation machines having an ingredient processing module for preparing a beverage with at least one ingredient supplied with a capsule. The machine comprises a positioner arranged to hold at least one capsule out of the ingredient processing module. It further comprises a sensing arrangement adapted to detect an event related to the insertion by a user of a capsule and/or the presence of the capsule on or into the positioner. The machine is configured, upon detection of the event, to transfer the capsule to the ingredient processing module by using transfer means, and then to start the preparation of the beverage. More particularly, the invention relates to a machine providing a convenient and safe solution to fully automate the preparation of a beverage.

5 Claims, 6 Drawing Sheets

(56) References Cited

U.S. PATENT DOCUMENTS

2010/0288132 A1* 11/2010 Gavillet .............. A47J 31/3628
                                                            99/295
2011/0000377 A1*  1/2011 Favre ................. A47J 31/3628
                                                            99/289 R

FOREIGN PATENT DOCUMENTS

| EP | 2301394 A1 * | 3/2011 | .......... A47J 31/3642 |
| FR | 2745995 A1 * | 9/1997 | .......... A47J 31/3633 |
| FR | 2907766 | 5/2008 | |
| JP | 0246289 | 3/1990 | |
| WO | 2006032564 A | 6/2006 | |
| WO | 2009113035 | 9/2009 | |
| WO | 2010099806 A1 | 9/2010 | |
| WO | WO 2010103044 A1 * | 9/2010 | .......... A47J 31/3633 |

* cited by examiner

AUTOMATIC BEVERAGE MACHINE

CROSS REFERENCE TO RELATED APPLICATIONS

The present application is a National Stage of International Application No. PCT/EP2012/054348, filed on Mar. 13, 2012, which claims priority to European Patent Application No. 11158017.1, filed Mar. 14, 2011, the entire contents of which are being incorporated herein by reference.

FIELD OF THE INVENTION

The invention pertains to the field of the beverage preparation machines, in particular using capsules containing an ingredient for preparing a beverage, such as beverage preparation machines having a motorized brewing chamber that can be opened and closed for inserting the capsule into the chamber and/or removal of a used capsule therefrom. More particularly, the invention relates to a machine providing a convenient and safe solution to fully automate the preparation of a beverage.

For the purpose of the present description, a "beverage" is meant to include any human-consumable liquid substance, such as coffee, tea, hot or cold chocolate, milk, soup, baby food or the like. A "capsule" is meant to include any pre-portioned beverage ingredient or combination of ingredients (hereafter called "ingredient") within an enclosing packaging of any suitable material such as plastic, aluminium, a recyclable and/or bio-degradable material and combinations thereof, including a soft pod or a rigid cartridge containing the ingredient.

TECHNICAL BACKGROUND

Certain beverage preparation machines use capsules containing an ingredient to be extracted or to be dissolved and/or an ingredient that is stored and dosed automatically in the machine or else is added at the time of preparation of the drink. Some beverage machines possess liquid filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing a beverage ingredient is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

Brewing devices have been developed to facilitate insertion of a capsule into the chamber, for instance, by using a feeding arrangement or a motorized brewing unit.

WO 01/84993 relates to a beverage machine with a movable drawer sliding horizontally to bring a capsule from a loading stated to an inserted position in a motorized brewing unit. Such machine allows automating tasks like the introduction of a capsule into the brewing unit or the preparation of a plurality of beverages. However, for triggering the preparation of the beverage, the user has still to either activate manually the movable drawer sliding and/or press a start button.

Rotating magazines storing capsules into cartridges are also known for automatically feeding a brewing unit. For instance, U.S. Pat. No. 6,240,832 teaches a magazine in a beverage machine, with recognition means for displaying information related to capsules stored in a user-selected cartridge, and having a transfer mechanism to feed the brewing unit with a capsule extracted from said cartridge. However, rotating magazines are mechanically complicated and cumbersome. They also raise several ergonomic concerns, in particular with a beverage machine conceived to be fed with several types of capsules. For example, if a user wishes to prepare a beverage with a capsule of a type which is not loaded in the magazine or which is in a position in the queue preventing it from being delivered right now, a new cartridge containing the desired capsule must be loaded, provided that a space is still available in the magazine; otherwise one of the cartridges must be flushed or extracted before the insertion of a new one. Moreover, for preparing a beverage, it is necessary to select a cartridge loaded with the desired type of capsules, then to press an appropriate button. This sequence may be perceived by the user as unnecessary long and not intuitive.

Furthermore, even if enhancing the user's interactions with the machine by increasing the level of automation is highly desirable, it usually comes along with safety issues, caused notably by moving parts actuated automatically by motors. In the field of the motorized beverage machines, it has been provided solutions to prevent or limit the risks of the insertion of inappropriate objects into the brewing chamber, like a finger or a spoon, which may cause damages to the machine and injuries to the user when the brewing unit is closed. For instance, EP1767129 relates to a beverage machine comprising a motorized brewing unit in which the capsule is inserted manually by gravity in an open passage between the jaw members of the unit. For safety reason, the passage can be blocked by a motorized closing gate.

However, there is still a need to increase the safety level of automated beverage machine, in particular whose having a automatic feeding arrangement cooperating with a motorized brewing unit.

SUMMARY OF THE INVENTION

An object of the invention is to provide more convenience, less user's intervention and more safety in the way of inserting a capsule in the machine. Another object is to provide added value functionalities such as semi-automatic or automatic brewing modes. Another object is to control optimal conditions for preparing a beverage.

One or more of these objects are met by a machine according to the independent claim(s). The dependent claims further provide solutions to these objects and/or additional benefits.

More particularly, according to a first aspect, the invention relates to a beverage preparation machine having an ingredient processing module for preparing a beverage with at least one ingredient supplied with a capsule. The machine comprises a positioner arranged to hold at least one capsule out of the ingredient processing module. The machine further comprises a sensing arrangement adapted to detect an event related to the insertion by a user of a capsule and/or the presence of the capsule on or into the positioner. The machine is configured, upon detection of the event, to transfer the capsule to the ingredient processing module by using transfer means, and then to start the preparation of the beverage. In particular, the machine may be configured to start the preparation of the beverage according to default parameters, for example a default volume of beverage to be prepared. The beverage may also be prepared using preset parameters, for example a customized volume of beverage preset by the user.

Consequently, the user has only to put a capsule in the positioner to trigger automatically the preparation of a beverage. This simple, quick and intuitive gesture replaces the traditional sequence consisting in opening the brewing unit, inserting a capsule, then closing the brewing unit and pressing a start button. Moreover, the user is free to place a capsule of its choice into the positioner: as consequence, the user can choose easily what type of capsule he wants to use to prepare its beverage, without having to fill in a cartridge or a magazine for example.

Moreover, the positioner is placed outside the ingredient processing module, in particular outside a brewing unit of the ingredient processing module, and preferably in a position where it is visible and accessible to the user, so that the latter may have a visual feedback. Consequently, if an object is placed into the positioner and is not detected as a capsule by the sensing arrangement, the user can more easily extract it away from the positioner. Also, the preparation of the beverage will not start automatically if a capsule is not detected into the positioner, improving the level of safety of the machine. It is also possible to provide other means for feeding the positioner with capsules put down by a user, for instance guiding means or luge arranged to transfer capsules to the positioner from an additional storage area.

In particular, the sensing arrangement may be adapted to detect the event by receiving or reading information from the capsule, and/or by measuring at least one of the following characteristic of the capsule: spectral property, colour, electrical property, resistivity, capacitance, electromagnetic property, magnetic induced field, mechanical property, geometry, weight, identifying information, code bar, emitted or reflected signal. The sensing arrangement may be further adapted to identify a type for the capsule; the machine is then configured to start the preparation of the beverage according to parameters adapted to, or depending of, the identified type of the capsule. The beverage can be prepared with optimized parameters, for instance the right volume of beverage to prepare according to the recognized type. Furthermore, it is possible to avoid user errors, consisting for example in preparing a volume of beverage higher than recommended for the recognized capsule.

In an embodiment, the machine is further configured to transfer the capsule to the ingredient processing module upon detection of the event as soon as the machine is ready to start the preparation of a beverage with the capsule. For example, if the machine is currently preparing another beverage, the user can still position a capsule into the capsule positioner: the machine will use said capsule as soon as possible. It may be also useful to prepare one beverage with a plurality of capsules of the same type, for example to obtain a higher volume, or with a plurality of capsules of the different type, for example to obtain a beverage made of a plurality of ingredients like a cappuccino. The machine can also be not ready to prepare the beverage, for example if its water tank is empty or not filled enough to prepare the beverage: then the user can still place a capsule into the positioner, and fill the water tank with water to start automatically the preparation of the beverage.

In an embodiment, the ingredient processing module comprises a first part and a second part which are movable relatively one another. The processing module is configurable into an opened position wherein a passage is provided between the first and second part for allowing the insertion of a capsule. The machine further comprises closing means arranged to close at least partially the passage. The machine is further configured to operate the closing means so as to open the passage upon the detection of the event. Moreover, the ingredient processing module may have only one unique passage for allowing the insertion of capsule, the closing means being then capable of closing the sole possible entry to feed the ingredient processing module. By using closing means, it is possible to physically obstruct the passage leading to the ingredient processing module, more particularly when the latter is in its opened position and whereas no capsule has been detected yet. Hence, unless the event related to the insertion of a capsule by the user into the positioner is detected, the entry into the processing module of an unexpected object is prevented. The level of safety of the machine is thus improved, the passage leading to a chamber of the processing module being closed to any object not detected as a capsule.

The positioner may be positioned relatively to the passage so as to allow the capsule to be transferred, upon the detection of the event, into the ingredient processing module at least partially under the action of the gravity force. The transfer means are then simplified since they may comprise only guiding means for guiding the capsule. In particular, the positioner may be positioned above the ingredient processing module and the passage, for instance, on top of the housing of the machine, to benefit from the action of the gravity.

The machine may also be further configured to operate the closing means so as to open the passage upon the detection of the event provided that the machine is currently ready to prepare a beverage. So, if the machine is not ready, the capsule will not leave the capsule positioner: as a consequence, the user could retrieve easily the intact capsule if he wants.

The closing means may be driven by a motorized arrangement for opening the passage upon the detection of the event. The closing means may be mechanically linked by a mechanical coupling means with the first part and/or a second part of the ingredient processing module for opening the passage upon the detection of the event.

In an embodiment, the closing means are part of the positioner. For example, the positioner may comprise a seat adapted to hold the capsule, the closing means comprising a sliding cover forming part of the seat: the machine is further configured to operate the closing means for opening the passage upon the detection of the event by translating the sliding cover. In another example, the positioner comprises a rotating body in which a seat adapted to hold the capsule is formed, the closing means comprising a closing part: the machine is configured, upon detection of the event to transfer the capsule to the ingredient processing module by rotating the rotating body into a position in which the closing part close at least partially the passage.

In an embodiment, the positioner is arranged to hold at least two capsules out of the ingredient processing module. The machine is further configured to transfer, in the ingredient processing module with the transfer means, each capsule held in the positioner, after ejection or removal from the ingredient processing module of a previous capsule and to carry on automatically the preparation of the beverage. This embodiment is particularly advantageous to reduce the user actions needed to prepare one beverage with a plurality of capsules of the same type, for example to obtain a higher volume, or with a plurality of capsules of the different type, for example to obtain a beverage made of a plurality of ingredients like a cappuccino.

According to a second aspect, the invention relates to a method for preparing a beverage with at least one ingredient supplied with a capsule in a beverage preparation machine having an ingredient processing module, said machine comprising a positioner arranged to hold at least one capsule out of the ingredient processing module. The method comprises the following steps:

- detection of an event related to the insertion by a user of a capsule and/or the presence of the capsule on or into the positioner;
- upon detection of the event, transfer of the capsule to the ingredient processing module by using transfer means, and then start of the preparation of the beverage.

BRIEF DESCRIPTION OF THE DRAWINGS

The invention will now be described with reference to the schematic drawings, wherein.

DETAILED DESCRIPTION OF THE INVENTION

Figure 1:
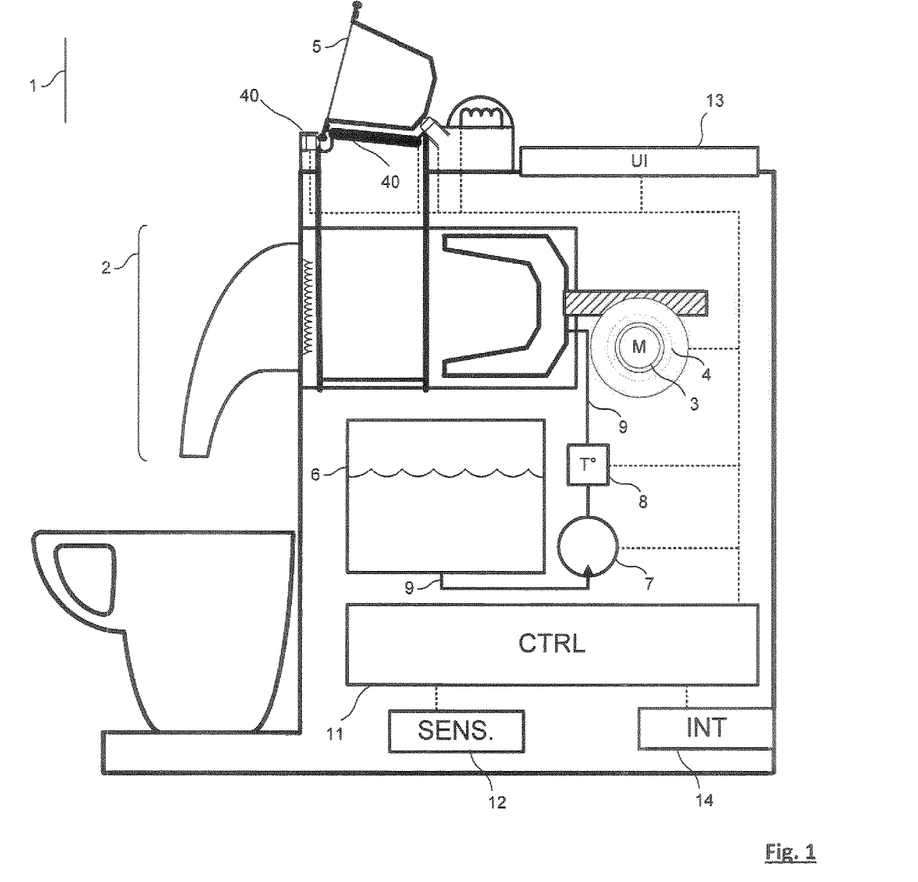
FIG. 1 is a schematic view of a beverage machine according to an embodiment.

A beverage machine 1 according to an embodiment is illustrated schematically on FIG. 1. The beverage machine comprises a brewing unit 2 which is coupled with an electrical motor 3 driving transmission means 4 for moving the brewing unit between an opened and a closed position. The brewing unit is represented in the opened position on FIG. 1. The brewing unit allows the preparation of a beverage from a capsule 5 containing at least one ingredient, e.g. ground coffee or tea or chocolate.

Figure 2:
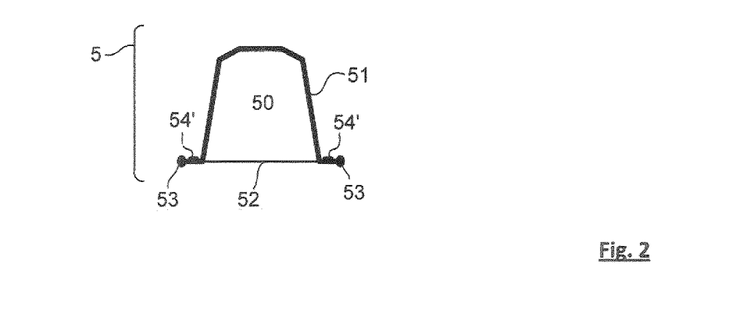
FIG. 2 is a cross section of a capsule adapted to be used by the beverage machine to prepare a beverage.

As shown in FIG. 2, the capsule has a generally cup-shaped body 51 and a covering membrane 52. Membrane is assembled to cup along a peripheral rim 54 of cup. The rim may be covered with a seal 54', e.g. made of elastomeric or plastic material. Furthermore, the capsule in particular the rim and/or the membrane may bear a ring or toroid 53, e.g. for assisting manufacturing and/or handling of the capsule.

Such capsule forms a packaging for containing an ingredient 50, e.g. ground coffee, of a beverage to be prepared with the beverage preparation machine. In an embodiment, the capsule forms a gastight packaging, e.g. made of aluminium or an aluminium-alloy. Alternatively, the capsule may be more or less pervious, e.g. perforated and/or made of organic, in particular plastic material, e.g. biodegradable material. The capsule's cup and/or the capsule's membrane may be made of a monolithic material, e.g. a metallic material or a conductive ceramic and/or conducive organic material, or may be made of a structure covered or containing a conductive material, e.g. a conductive coating or track, e.g. an aluminium, iron and/or copper coating or track.

As represented on FIG. 1, water supply means are also provided as a part of the machine, such means including a water reservoir 6, a water pump 7 and a water heater 8. Water circulates in a water circuit 9 which is linked to the brewing unit. Controller is also provided in the machine. The controller includes typically a control unit 11, sensors 12 and a user interface 13. The control unit includes processor(s), memories and programs enabling to provide appropriate inputs to and receive outputs from the different activation means of the machine in particular, the pump, heater, motor and user interface.

Figure 3A:
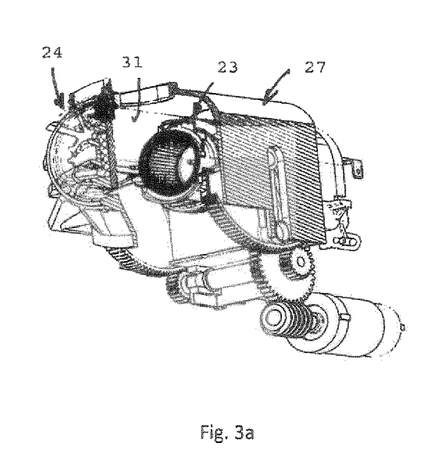
FIG. 3a is a partial cross section perspective representation of a brewing unit of the beverage machine of FIG. 1 in open position.
Figure 3B:
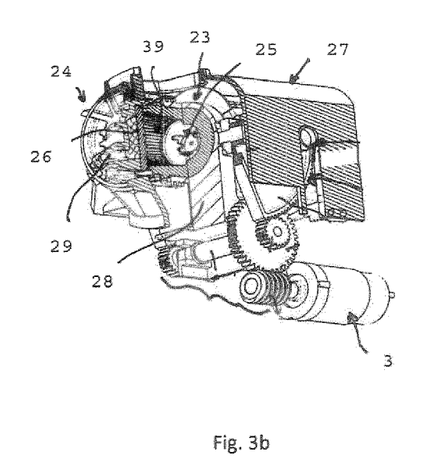
FIG. 3b shows a partial cross section perspective representation of a closed brewing unit of the beverage machine of FIG. 1 in an "empty closure mode"
Figure 3C:
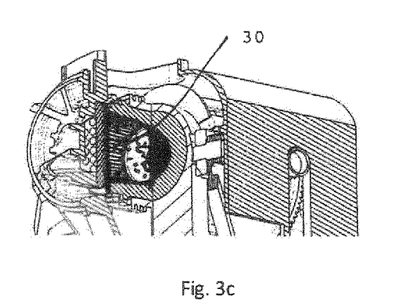
FIG. 3c shows a partial cross section perspective representation of a closed brewing unit of the beverage machine of FIG. 1 in a "capsule closure mode"

Referring now to FIGS. 3a, 3b, and 3c, there is shown therein an exemplary motorized embodiment of the brewing unit. The brewing unit more particularly comprises a first assembly 23 and a second assembly 24 which are movable relatively one another. In this particular mode, the rear injection assembly 23 represents the capsule cage including injection blades 25. The front assembly 24 represents the beverage delivery assembly and includes a capsule delivery plate 26. The front assembly is associated to an outer casing 27 and the whole is movable relatively to the rear injection assembly 23 which remains fixed to a frame 28. The front delivery assembly 24 comprises a beverage outlet 29. The front delivery assembly 24 is moved relatively to the rear injection assembly 23 by means of the motor 3 which drives the transmission means 4. In the opened position (FIG. 3b), a passage 31 is provided between the first and second assemblies 23, 24 for allowing the insertion of a capsule. In the closed position (FIG. 3c), a brewing chamber 39 is provided.

The beverage machine further comprises a capsule positioner 40 having a seat adapted to store at least one first capsule out of the brewing chamber, and preferably outside the brewing unit. In an embodiment, the positioner is arranged to store at least a second capsule, out of the brewing chamber, and preferably outside the brewing unit. The capsule positioner may comprise a closing apparatus operable for switching the capsule holder between at least an opened position and a closed position. In the closed position, the capsule holder is configured to store the capsule in the seat. In the opened position, the capsule holder is configured to allow a capsule, pre-positioned into the capsule seat, entering the brewing unit chamber. More particularly, the capsule positioner is arranged so as to allow a capsule entering and passing through the passage of the brewing unit before reaching the capsule chamber, when the capsule positioner is set in its opened position. The capsule may be transferred from the capsule positioner in the opened position to the brewing unit by transfer means such guiding means, motorized elements, moving parts, actuators and/or any other means adapted to move the capsule out of the seat to the brewing unit, and in particular to the brewing unit chamber. Advantageously, the closing apparatus is arranged to close at least partially the passage when the capsule positioner is in its closed position, notably in order to prevent the unsafe entry of an unexpected object into the brewing unit.

Figure 4A:
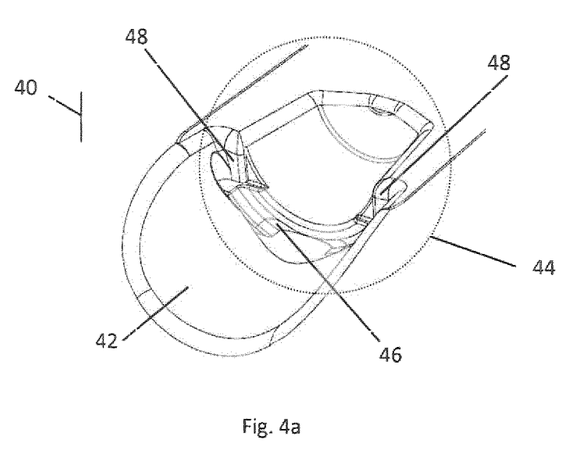
FIG. 4a is a detailed view of a capsule positioner of the beverage machine of FIG. 1, in a closed position, according to a first embodiment.
Figure 4B:
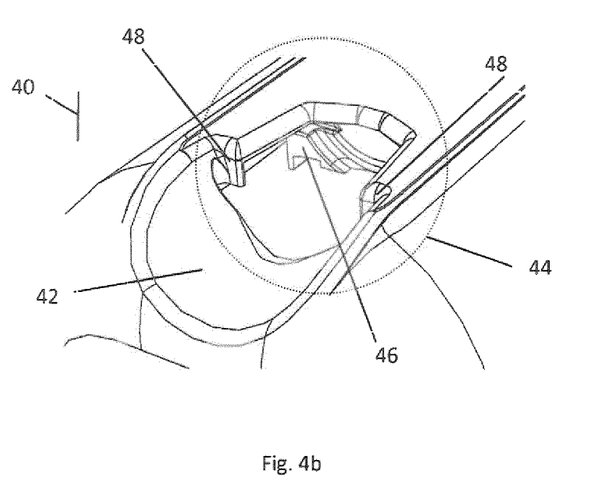
FIG. 4b is a detailed view of a capsule positioner of the beverage machine of FIG. 1, in an open position, according to a first embodiment.

In a first embodiment, as shown in FIGS. 4*a* and 4*b*, the capsule seat 44 is formed in a housing 42 that may be integrated to the housing of the beverage machine as shown on FIGS. 4, 5. Alternatively, the capsule seat may be a separate part mounted on the housing of the beverage machine (not represented on the drawings). The capsule seat may comprise guides 48 formed into the housing 42 and surrounding the capsule seat, in particular to ease the positioning of a capsule by a user when the capsule positioner is in the closed position, and/or to improve the holding of a capsule in the seat. Moreover, the guides may be arranged to guide the movement of the capsule when the capsule positioner is switched to its opened position, and to prevent a capsule inserted into the seat to be translated with the closing apparatus, for example when the capsule holder is switched from the closed to the opened position.

In the first embodiment, for switching the capsule positioner between the opened and closed positions, the closing apparatus 46 may be driven by a motorized arrangement, controlled for example by the control unit 11 or by an additional controller. Alternatively, the closing apparatus may be mechanically linked by a mechanical coupling means with the brewing unit, and in particular with the first assembly 23 and/or the second assembly 24, so as to switch between the opened and closed positions depending on whether the brewing unit is opened or closed. For instance, the mechanical coupling means may be arranged to open the closing apparatus when the brewing unit is in the opened position, and to close the closing apparatus otherwise. In an embodiment, the closing apparatus may be rigidly fixed to a part of the brewing unit or be formed by a part of the brewing unit, in particular by the first assembly 23 and/or the second assembly 24. The capsule holder housing comprises an opening large enough to let a capsule pass through it. In particular the outlines of said opening may reproduce sensibly the outlines of a longitudinal cross section profile of a capsule. When the capsule positioner is closed, as illustrated on FIG. 4*a*, the base of the capsule seat is formed by the closing apparatus. When the capsule positioner is opened, as illustrated on FIG. 4*b*, the closing apparatus is configured to authorize a capsule positioned onto the capsule seat 44 to leave the capsule seat. In particular, the capsule positioner 40 is positioned on the upper part of the housing of the beverage machine to let a capsule falling into the passage 31 under the action of the gravity force, when the capsule positioner is opened.

In the first embodiment, the closing apparatus 46 may be included in the capsule seat and forms part of it. More particularly, the closing apparatus may comprise a sliding cover inserted into lateral guides of the housing. The shape of the sliding cover may comprise an area with a recess having sensibly the outside shape of a part of the capsule. The sliding cover may be translated, along one longitudinal axis defined by the configuration of the lateral guides, to switch the positioner between its opened and closed positions. The translation of the sliding cover may be performed using a motorized arrangement (not represented), and/or with the help of mechanical coupling means (not represented) linked with the first and/or the second assembly of the brewing unit (not represented), and/or may be part of the first or the second assembly of the brewing unit itself (not represented).

In a second embodiment, shown in FIG. 6, the capsule positioner comprises a rotating body 83 in which the capsule seat is formed. The rotating body is rotatably mounted relatively to the housing of the machine, for example around a pivot Oy. The rotating body 83 is operable, for switching the capsule holder from its closed position to its opened position, by applying a movement of rotation of an angle α around its pivot Oy. A movement of rotation of an angle −α may be applied to the rotating body around its pivot Oy to switch the capsule holder from the opened position to the closed position. In the closed position of the capsule holder, as represented on FIGS. 6*a* and 6*b*, the rotating body may receive and hold a capsule into its seat. In the opened position of the capsule holder, as represented on FIGS. 6*e* and 6*f*, the rotating body is configured to release a capsule, pre-positioned in the capsule seat, into the brewing unit chamber through the passage 31. For instance, as represented in particular on FIG. 6*f*, the release of the capsule may result of its sliding out the base part of the seat where the capsule is held to an opened area of the rotating body. The sliding of the capsule is caused by the rotation of the rotating body and the action of the gravity. Other means for releasing the capsule when the capsule holder is in its opened position may be used, for instance, movable hooks, actuated traps, moving parts, or any means suitable for extracting the capsule out of the seat. Intermediate positions of the rotating body from the opened position to the closed position are represented on FIGS. 6*c* and 6*d*. The rotation of the rotating body 83 for switching the capsule positioner between the opened and closed positions may be driven by a motorized arrangement driven by the control unit 11 or an additional control unit. Alternatively, as shown on FIGS. 6*a*, 6*c* and 6*e*, the rotating body 83 may be mechanically linked by mechanical coupling means 85 with the brewing unit, and in particular the first assembly 23 and/or the second assembly 24, so as to switch between the opened and closed positions depending on whether the brewing unit is opened or closed. For instance, the mechanical coupling means 85 may be arranged to open the closing apparatus when the brewing unit is configured in its opened position, and to close the closing apparatus otherwise. The housing of the machine comprises an opening 82 large enough to let a capsule pass through it. In particular the outlines of said opening may be sensibly circular. When the capsule positioner is closed, as illustrated on FIGS. 6*a* and 6*b*, the base of the capsule seat is formed by a base part 84 of the rotating body 83. When the capsule positioner is opened, as illustrated on FIGS. 6*e* and 6*c*, the rotating body is arranged to let a capsule positioned into the capsule seat leaving the capsule seat. Moreover, in an embodiment, the closing arrangement is formed notably by a closing part 86 of the rotating body which closes at least partially the opening in the housing of the machine.

As illustrated on FIG. 1, the beverage machine comprises a capsule detector 50 and, optionally, a recognition unit 60. The capsule detector is adapted to detect a presence of a capsule onto the capsule seat and/or passing through the capsule seat. The optional recognition unit is adapted to determine a type for a detected capsule positioned onto the capsule positioner or passing through the capsule seat. The detection of a capsule and optionally the recognition of its type can be obtain by receiving or reading information from a capsule, for example identification data emitted by a radiofrequency component embedded in the detected capsule. It can also be realized by measuring at least one characteristic of the capsule, for example: spectral property, electrical property, electromagnetic property, emitted or reflected signal, color, resistivity, capacitance, variation of the magnetic field, magnetic induced field, geometry, code bar, identifier, signal, electromagnetic echo, weight, and mechanical parameter. Some characteristics may be obtained passively by a sensor without interacting with the detected capsule. For instance, it is possible to recognize an outside color of a part of the capsule. Other characteristics may be obtained actively by the sensor in interacting with the detected capsule. For example the sensor may apply an alternative current to the detected capsule and then may measure parameters of the inductive field generated this way and/or resistivity and/or capacitance of the detected capsule.

The capsule detector and the recognition unit are represented as two separated functional units on FIG. 1. However, the capsule detector and the recognition unit may be implemented on a single device configured to detect the presence of a capsule in the capsule positioner and to recognize a type associated to said capsule. Moreover, in the perspective views of FIGS. 4, 5 and 6, the capsule detector and the recognition unit are not visible, hidden by the housings of the beverage machine and of the capsule positioner. The capsule detector and the recognition unit may be positioned in the vicinity of the capsule positioner, and more particularly, near, around and/or in the capsule seat.

Figure 6A:
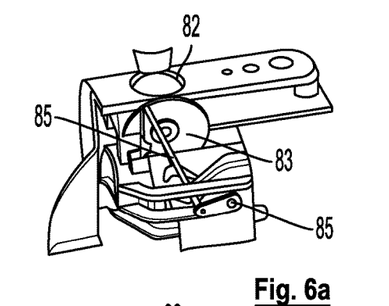
FIGS. 6a, 6b, 6c, 6d, 6e and 6f show detailed views of a capsule positioner of the beverage machine of FIG. 1, according to a second embodiment and a typical sequence leading to the introduction of a capsule into the brewing unit, according to the invention.
Figure 6B:
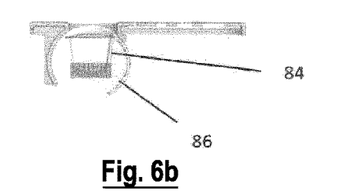
Figure 6C:
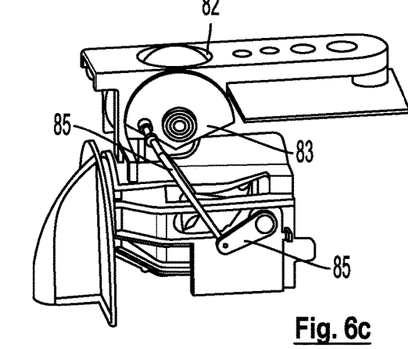
Figure 6D:
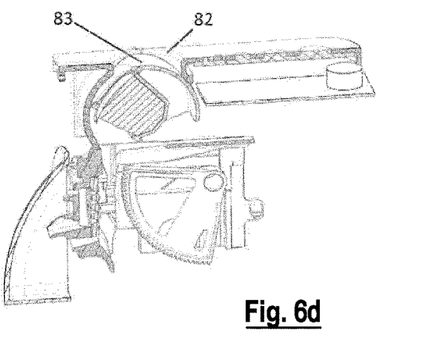
Figure 6E:
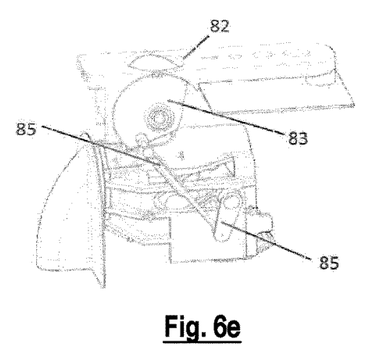
Figure 6F:
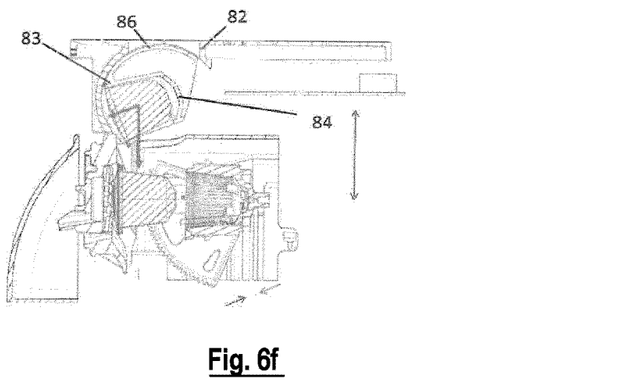
Figure 7:
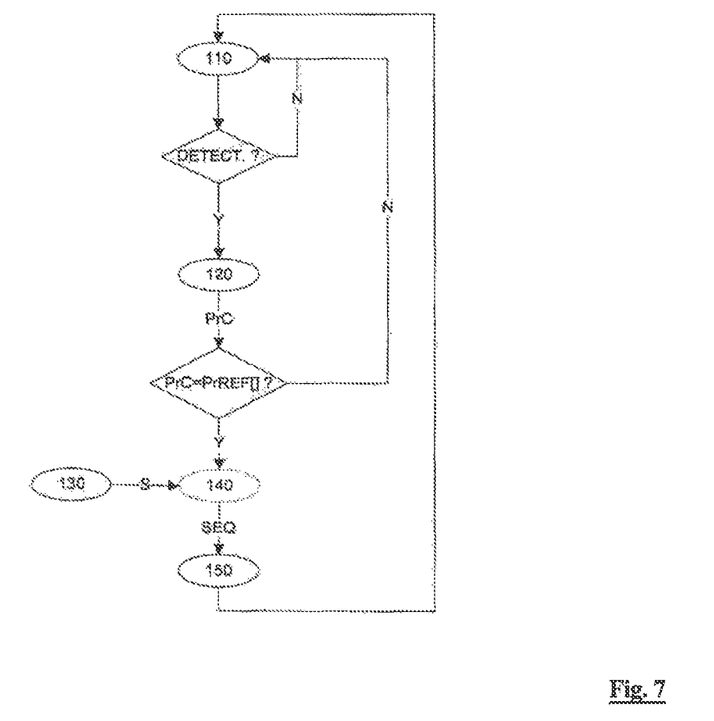
FIG. 7 is a block diagram illustrating a method according to an embodiment for automatically handling the start of the preparation of a beverage, according to an embodiment.

Referring now to FIGS. 5, 6 and 7, there is shown therein the steps of a method for automatically handling the start of the preparation of a beverage, according to an embodiment.

Figure 5A:
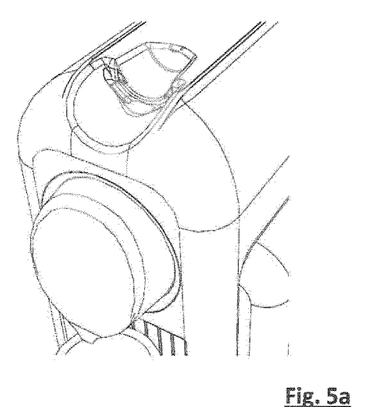
FIGS. 5a, 5b, 5c and 5d show a typical sequence leading to the introduction of a capsule into the brewing unit.

As illustrated on FIGS. 5a, 6a and 7, the machine is initially in a state $S_1$ in which the capsule positioner is closed. In this state $S_1$, a capsule cannot enter the brewing chamber through the capsule positioner. In the state $S_1$, the machine is running in an operating mode in which at least the capsule detector is fully functional.

Figure 5B:
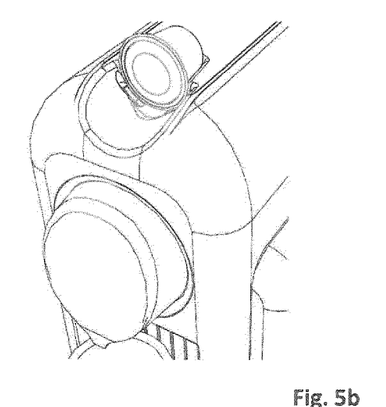
Figure 5C:
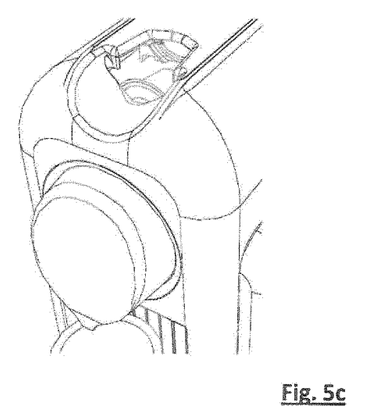
Figure 5D:
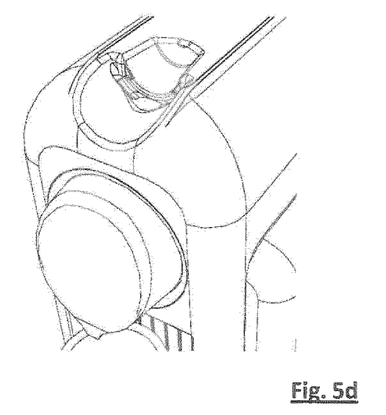

Referring to FIGS. 5b, 6b and 7, during a first step 110, the capsule detector is used to watch over the capsule seat, so as to detect a presence of a capsule onto the capsule seat. The capsule detector may be operated continuously. Alternatively, the capsule detector may be used during discrete time periods: for example the capsule detector is activated every second during the time needed to detect an eventual presence of a capsule onto the insertion area. The first step is carried out repeatedly, until a capsule is actually detected. For example, the first step may terminate after the detection of a capsule inserted by a user onto the capsule seat, as shown on FIGS. 5b, 6b.

Optionally, upon detection of a capsule, the machine switches to a second state $S_2$, wherein the recognition unit is active and fully functional. In an embodiment, the recognition unit may be always active and fully functional, and in particular when the machine is in the first state $S_1$. Consequently the first and the second state may be considered as equivalent in this embodiment.

During an optional second step 120, the recognition unit is used to measure a set of characteristics of the capsule detected during the first step.

A profile $Pr_C$ of the detected capsule can then be drawn up from the measured characteristics. The profile $Pr_C$ comprises at least one minimal set of information necessary to identify the belonging of the detected capsule to a reference group. A corresponding reference profile $Pr_{REF}$ is defined for each reference group, defining a set of reference profiles $Pr_{REF[\ ]}$. The reference groups are used to divide capsules into different sets. Each reference profile $Pr_{REF}$ comprises at least a minimal set of characteristics that a capsule should reproduce to be identified as belonging to at least one corresponding reference group. Each reference profile $Pr_{REF}$ may comprise, for at least each characteristic of the minimal set, a target value, a range, and/or a list of acceptable target values that a capsule should reproduce to be identified as belonging to the corresponding reference group.

During the optional second step, the controller 10 compares the profile $Pr_C$ of the detected capsule with the reference profiles $Pr_{REF[\ ]}$. The reference profiles $Pr_{REF[\ ]}$ may be stored permanently or temporarily within the memories of the controller 10. The reference profiles $Pr_{REF[\ ]}$ may be entered on the machine at a setup step or being downloaded on demand. The reference profiles $Pr_{REF[\ ]}$ may be obtained from a remote location or from a removable memory device, like an USB key or from a portable digital device, connected temporarily to the machine. The reference profiles $Pr_{REF[\ ]}$ may be updated or parameterized, for example, to take into consideration particular characteristics of the machine, such as calibration data or actual characterization performances of the recognition unit. In particular, it is determined whether the capsule's profile $Pr_C$ matches one of the reference profiles $Pr_{REF[\ ]}$. If the profile $Pr_C$ of the capsule does not match any reference profiles $Pr_{REF[\ ]}$, information I1_UNIDENTIFIED is generated by the controller 10. By contrast, if the profile $Pr_C$ of the capsule matches one of the reference profiles the reference profiles $Pr_{REF[\ ]}$, information I1_IDENTIFIED is generated by the controller 10. The information I1_IDENTIFIED includes at least information to identify the corresponding reference profile, for example a unique identifier corresponding to a given reference profile $Pr_{REF}$.

Several criteria may be applied to determine if a profile matches one of the reference profiles.

For example, a given capsule may belong to one of four groups: aluminium capsules, capsules adapted to prepare a short espresso (ristretto, 25 ml), capsules adapted to prepare an espresso (40 ml), capsules adapted to prepare a long espresso (lungo, 110 ml). The reference profile $Pr_{REF}$ corresponding to the aluminium capsules contains for example a resistivity range centered around 100 ohms more or less 10%. The reference profile $Pr_{REF}$ corresponding to the short espresso group may contain a color range covering green tones (between 520 and 570 nm, for example). In this last example, the profile of a capsule having a light green outside membrane and a measured resistivity of 97 ohms would match the reference profile of the short espresso group and those of the aluminium capsules group. Consequently, the capsule would be considered as belonging to the short espresso group and to the aluminium capsules group. A capsule having a red outside membrane would not be considered as a member of the short espresso group.

In an embodiment, a reference profile may also comprise a plurality of minimal sets of information necessary to identify the belonging of the detected capsule to one reference group. In particular, a reference profile may comprise, for at least one characteristic of the minimal set, a plurality of target value, and/or range, and/or list of acceptable target values, that a capsule should reproduce to be identified as belonging to the corresponding reference group. For example, the reference profile $Pr_{REF}$ corresponding to the short espresso group may contain a plurality of color ranges covering green tones (between 520 nm and 570 nm, for example) and red tones (between 630 nm and 740 nm, for example). In this last example, the profile of a capsule having a light green outside membrane would match the reference profile of the short espresso group. The profile of a capsule having a red outside membrane would also match the reference profile of the short espresso group.

In another example, the reference profile $Pr_{REF}$ corresponding to the aluminium capsule may contain a plurality of couples of target resistance and capacitance values. A profile of a capsule will match a reference profile of the aluminium capsule if:

the capsule has a resistance of 100 ohms+/−5% and a capacitance of 100 nF+/−2%; or, the capsule has a resistance of 1000 ohms+/−5% and a capacitance of 50 nF+/−2%.

In this last example, the profile of a capsule having a resistance of 101 ohms and a capacitance of 50 nF will not be considered to belong to the aluminium capsules group.

Other approach may be applied to determine if a profile matches one of the reference profiles, for example using Bayesian networks, self-learning neural networks, and, generally speaking, probabilistic methods.

In a third optional step 130, a current status S of the machine is determined, read or accessed by the controller 10. In particular, the current status S may include at least one or a combination of parameters related to items included in the following non exhaustive list: the presence of a capsule into the brewing chamber or in the cage of the brewing chamber, the completion state of a beverage preparation process, the current availability of the different components of the machine, the level of water into the water tank, the readiness of the thermo-block.

In a fourth step 140, a sequence SEQ of actions is determined or chosen. If a capsule has been detected during the first step 110, whether said capsule has been recognized or not, the sequence SEQ comprises at least an action to set the capsule holder into its opened position, and an action to start automatically the preparation of the beverage when the detected capsule has reached the brewing unit chamber. However, the sequence SEQ may be determined or adapted, for example to adapt the preparation process, according to the result of the comparison between the capsule's profile $Pr_C$ and the reference profiles $Pr_{REF[\ ]}$, and more generally whether the capsule has been recognized or not.

In a fifth step 150, each action of the sequence SEQ is actually performed by the beverage preparation machine.

In an exemplary embodiment, if a capsule has been detected, the sequence SEQ comprises an action to open the brewing unit if necessary, an action to switch the capsule holder to its opened position, an action to close the brewing unit if necessary as soon as the capsule has entered the brewing chamber, and an action to start the beverage preparation process. The user has consequently only to put a capsule into the capsule holder to start automatically the preparation of a beverage. No other user interaction, like pressing a button for example, is needed anymore. Moreover, only the detection of a capsule may trigger the execution of this sequence SEQ, enhancing both the safety level and the ergonomic of the beverage machine.

In another exemplary embodiment, if the profile $Pr_C$ does not match any reference profiles $Pr_{REF[\ ]}$, then the sequence SEQ comprises an action to inform the user via the User Interface, for example by a visual and/or sound message, that the capsule has not been recognized. The sequence SEQ comprises also actions to prepare the beverage according to default parameters. By contrast, if the profile $Pr_C$ matches one of the reference profiles $Pr_{REF[\ ]}$ an action to inform the user via the User Interface, for example by a visual and/or sound message, that the capsule has been effectively recognized can be inserted into the sequence SEQ. More precisely, specific information related to the recognized reference profiles may be displayed, for example the name of the corresponding reference group. Hence, it is possible to display a message to the user indicating that the capsule is intended to prepare a short espresso. Of course, other information may be given to the user, for example, vocal and/or visual instructions, a visual representation of the capsule, commercials information, recipes, other kind of capsules that the user could be interested in, etc. The sequence SEQ comprises actions to prepare the beverage using parameters, customized according to the type of the capsule, for example a customized volume of water.

The sequence SEQ may also be determined by taking into consideration the current status S of the machine. The current status S may be analyzed to determine whether the machine is ready and/or capable of preparing a beverage with the detected capsule. A set of rules R may be defined to determine which actions should be undertaken according to the belonging of the detected capsule to a set of groups, and the current status S of the machine.

For example, a rule R1 indicates that a capsule should be detected. Another rule R2 indicates that the preparation of a beverage is only possible if the brewing chamber is empty. A rule R3 states that the actions necessary to prepare a beverage with the detected capsule are introduced into the sequence SEQ, if the rule R1 and the rule R2 are both verified. A rule R4 states that if the rule R2 is not verified, the actions necessary to wait until the rule R2 is verified and to prepare then a beverage with said capsule are introduced into the sequence SEQ. Thus, if a capsule has been detected, then the rule R1 is verified. However, supposing that another beverage is already in hand, the rule R2 is not satisfied. According to rule R3, a beverage can't be prepared with the capsule disposed by the user into the capsule positioner, since rule R1 and rule R2 are not both verified. However, as stated by the rule R4, the machine will wait the end of the preparation of the previous beverage, and just after the end, will prepare the beverage with the detected capsule. This example might be advantageous to prepare long coffee with at least two capsules, the user being able to prepare its beverage only by putting an adequate number of capsules into the capsule holder, the operation being fully automated.

In another example, a rule R1 indicates that a capsule should be detected. The rule R2 also adapts the actions to prepare different volumes of the beverage, according to the belonging of the detected capsule to one of the three groups "ristretto", "lungo", "normal". Thus, if a capsule has been detected, then the rule R1 is verified. Moreover, if the capsule belongs to the "lungo" group, the actions are adapted to prepare a beverage having a volume corresponding to the "lungo" group, typically 120 ml. If the capsule has not been recognized, the actions are adapted to prepare a volume of beverage corresponding to a default value.

A series of typical use cases of the machine according to the embodiments will now be discussed.

Example 1

The machine is powered on. The capsule positioner is closed, no capsule being inserted into the capsule seat. The brewing unit is opened. A user puts into the capsule positioner a capsule. Since the capsule positioner is closed, the capsule is hold into the capsule seat, and cannot enter the brewing chamber. The detector then detects the presence of said capsule. The capsule positioner is opened, allowing the capsule to enter the chamber of the brewing unit, the brewing unit is closed, and the beverage is prepared.

Example 2

The machine is powered on. The capsule positioner is closed, no capsule being inserted into the capsule seat. The brewing unit is closed. A user puts into the capsule positioner a capsule. Since the capsule positioner is closed, the capsule is held into the capsule seat. The detector then detects the presence of said capsule, and the recognition unit does not recognize the pre-positioned capsule. A visual message is brought to the intention of the user indicating that the capsule has not been recognized or that default parameters will be used for the preparation of the beverage. The brewing unit and the capsule positioner are opened, allowing the capsule to enter the chamber of the brewing unit. Then, the brewing unit is closed, and the beverage is prepared, according to default parameters.

Example 3

The machine is powered on. The capsule positioner is closed, no capsule being inserted into the capsule seat. The brewing unit is closed and the preparation of a first beverage is in hand. A user put into the capsule positioner a capsule. The detector then detects the presence of said capsule, and the recognition unit determines the type of the pre-positioned capsule. The capsule positioner being closed and the machine being not ready to prepare another beverage since the preparation of the first beverage is not already finished, the capsule positioner is kept closed until the brewing unit is ready to prepare a new beverage. During this period, a visual message, for instance a blinking light, is brought to the intention of the user indicating that the capsule has been recognized, the machine is not ready to prepare another beverage but the beverage will be prepared as soon as possible after the end of the preparation of the first beverage. Then the capsule positioner is opened, the brewing unit is fed with the detected capsule and is closed automatically, and a beverage is then prepared.

Example 4

The machine is powered on. The capsule positioner is closed, no capsule being inserted into the capsule seat. The brewing unit is closed and the preparation of a first beverage is in hand. A user puts into the capsule positioner a capsule. The detector then detects the presence of said capsule, and the recognition unit determines that the pre-positioned capsule can be used to prepare a beverage and that capsule is adapted to prepare a long espresso with 120 ml of water. The water tank of machine contains 78 ml of water, and a sensor has sent this information to the controller. The capsule positioner being closed and the machine being not ready to prepare a long espresso since there is not enough water available, the capsule positioner is kept closed until the water tank is filled with enough water. During this period, a visual message, for instance a blinking light, is brought to the intention of the user indicating that the capsule has been recognized as a suitable capsule to prepare a long espresso, that the water tank of the machine should be filled with water, and that a long espresso will be prepared as soon as possible when enough water will be provided. Then the user fills the tank with water up to 500 ml. The capsule positioner is opened, the brewing unit is fed with the detected capsule and is closed automatically, and a lungo espresso beverage is then prepared.

The invention claimed is:

1. A method for preparing a beverage with at least one ingredient supplied with a capsule in a beverage preparation machine comprising an ingredient processing module, a housing, and a sliding cover inserted into the housing and forming at least part of a seat configured to receive and hold the capsule out of the ingredient processing module, the method comprising:

closing at least partially a passage formed by an open position of a first part and a second part of the ingredient processing module that are movable relative to each other, the passage configured to allow insertion of the capsule, the closing at least partially of the passage comprises moving the sliding cover by translation in a first direction relative to the housing to position the sliding cover over at least part of the passage;

receiving the capsule in the seat at least partially formed by the sliding cover while the sliding cover is over at least part of the passage to hold the capsule on an upper surface of the housing and out of the ingredient processing module, the housing of the beverage preparation machine encloses the ingredient processing module, the beverage preparation machine comprising guides on opposing sides of the sliding cover, the sliding cover is inserted into the guides within a top surface of the housing, the guides extending in the same direction as the sliding cover, the capsule comprises a cup-shaped body, and the seat in the sliding cover comprises a recess having a shape corresponding to a shape of an outside part of the capsule;

detecting an event selected from a group consisting of an insertion by a user of the capsule, a presence of the capsule on or into the seat, and a combination thereof; and upon detection of the event, transferring the capsule to the ingredient processing module by moving the sliding cover by translation in a second direction relative to the housing opposite to the first direction and using a transfer member formed in the housing to direct the capsule into the ingredient processing module at least partially under the action of gravity, and then starting preparation of the beverage.

2. The method of claim 1, comprising directing the capsule from the seat to the passage that leads into the ingredient processing module, the transfer member comprises the guides that perform the directing.

3. The method of claim 1, comprising:
the beverage preparation machine operating the sliding cover to open the passage upon the detection of the event, wherein the seat is positioned relative to the passage to allow the transferring, upon the detection of the event, of the capsule through the passage into the ingredient processing module at least partially by gravity force.

4. The method of claim 1, wherein the detection of the event comprises receiving or reading information from the capsule and/or measuring at least one characteristic of the capsule selected from the group consisting of spectral property, color, electrical property, resistivity, capacitance, electromagnetic property, magnetic induced field, mechanical property, geometry, weight, identifying information, code bar, emitted signal, and reflected signal.

5. The method of claim 1, wherein the event is detected by a capsule detector provided by the beverage preparation machine, the capsule detector configured to detect at least one of a presence of the capsule on the seat or the capsule passing through the capsule seat.

* * * * *